(12) United States Patent
De Samber et al.

(10) Patent No.: US 7,368,703 B2
(45) Date of Patent: May 6, 2008

(54) OPTOELECTRONIC INPUT DEVICE, METHOD FOR PRODUCTION OF SUCH A DEVICE, AND METHOD FOR MEASURING THE MOVEMENT OF AN OBJECT WITH THE HELP OF SUCH A DEVICE

(75) Inventors: Marc Andre De Samber, Eindhoven (NL); Roger A. Vranken, Eindhoven (NL); Johannes Wilhelmus Weekamp, Eindhoven (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 451 days.

(21) Appl. No.: 10/543,279

(22) PCT Filed: Jan. 22, 2004

(86) PCT No.: PCT/IB2004/050045

§ 371 (c)(1),
(2), (4) Date: Jul. 25, 2005

(87) PCT Pub. No.: WO2004/068537

PCT Pub. Date: Aug. 12, 2004

(65) Prior Publication Data

US 2006/0124837 A1    Jun. 15, 2006

(30) Foreign Application Priority Data

Jan. 28, 2003   (EP) ................................. 03100171

(51) Int. Cl.
 *G06M 7/00*   (2006.01)
 *G06F 3/042*  (2006.01)
 *G06K 9/74*   (2006.01)
(52) U.S. Cl. .................. 250/221; 345/175; 345/176; 356/71
(58) Field of Classification Search ............ 250/221; 345/163, 165–170, 175, 176; 382/115, 120–127; 178/18.09; 356/71
See application file for complete search history.

(56) References Cited

U.S. PATENT DOCUMENTS

| 5,761,178 A | * | 6/1998 | Fukakusa et al. | ...... 369/112.27 |
| 6,091,689 A | * | 7/2000 | Taniguchi et al. | ..... 369/112.21 |
| 2002/0104957 A1 | | 8/2002 | Liess et al. | |

FOREIGN PATENT DOCUMENTS

| EP | 0810589 A1 | 12/1997 |
| EP | 0810589 B2 | 12/1997 |

* cited by examiner

*Primary Examiner*—Georgia Epps
*Assistant Examiner*—Brian J Livedalen

(57) ABSTRACT

The invention relates to an optoelectronic input device (10) in which the input is formed by detected movements of an object (M), the device comprising an optical module (11) comprising at least one laser (1,1') with a cavity for the generation of a measuring radiation beam (S), optical means (2) for the guidance of the radiation beam (S) to a plane (V) close to the object (M) and conversion means (C) for the conversion of measuring beam radiation reflected and modulated by the object into an electrical signal, wherein the conversion means (C) are formed by a combination of the cavity of the laser (1) and measuring means (3) for measuring a change in the cavity during operation, which radiation is caused by reflected radiation entering the cavity. The optical module (11) comprises the laser (1) mounted on a mounting board (4) with its cavity parallel thereto, and the optical means (2) comprises an optical component (2) like a mirror (2) mounted on the board (4) and aligned to the laser (1) which directs the beam (S) towards the plane (V). According to the invention the device (10) comprises a further optical component comprising a block-shaped body (5) which along side the laser (1) is directly mounted on the mounting board (4) and viewed in projection does not show overlap with the laser (1) and of which at least the upper part (5A) is optically transparent and of which the upper side forms the plane (V) close to the object (M). Such a device (10) can be relatively compact and, moreover, it can be manufactured more easily and cost-effectively. The invention also comprises a method of manufacturing such a device and a method for inputting the movement of an object (M) therewith.

16 Claims, 2 Drawing Sheets

Figure 1:
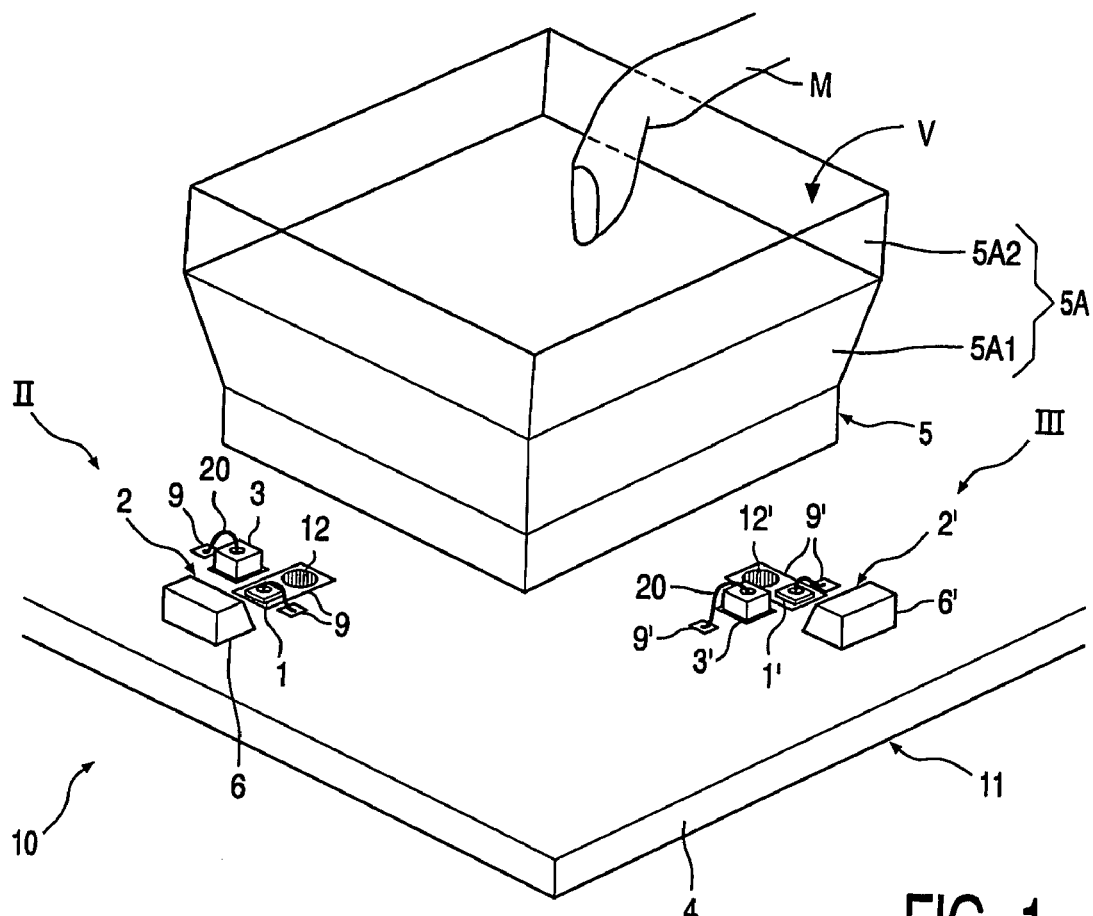

OPTOELECTRONIC INPUT DEVICE, METHOD FOR PRODUCTION OF SUCH A DEVICE, AND METHOD FOR MEASURING THE MOVEMENT OF AN OBJECT WITH THE HELP OF SUCH A DEVICE

The invention relates to an optoelectronic input device in which the input is formed by detected movements of an object, the device comprising an optical module comprising at least one laser with a cavity for the generation of a measuring radiation beam, optical means for the guidance of the radiation beam to a plane close to the object and converting means for the conversion of radiation of the measuring radiation beam reflected and modulated by the object into an electrical signal, the converting means being formed by the combination of the cavity of the laser and measuring means for the measuring of a change in the cavity during operation, which radiation is caused by the reflected radiation entering the cavity which is representative of a movement of the object relative to the module, the optical module comprising a laser which is mounted on a mounting board with its cavity parallel thereto, and the optical means comprising an optical component mounted on the mounting board and aligned to the laser from where the measuring radiation beam emitted by the laser goes to the plane close to the object.

A device of this kind is particularly suitable as input means for a PC, where the function of the document so-called mouse can then be taken over. The device is even more suitable as a scroll and click device in a portable unit, such as a mobile telephone, for the operation of a so-called scrolling menu. In a printer or scanner movements of the input and output medium can be detected with the device. The invention also relates to a method of operation for the production of such a device and a method of operation for measuring the movement of an object with the help of such a device.

A device of the type named in the introduction is known from United States patent application which was published on Aug. 8, 2002 under number US 2002/0104957. In this document—see FIG. 9a—an input device is shown where, on a mounting board, which is formed as a foot fitted with mounting pins, a laser is mounted with its cavity parallel to the mounting board. The device comprises three such lasers which are assembled at 120-degree angles (see FIG. 9b). Around the lasers is attached a ring-shape body of which one inner side forms a converging mirror which leads a measuring radiation beam emitted by the laser via a lens to a window in the cap of the module. Part of the radiation reflected from the above to a moving object comes again straight into the cavity of the laser(s). The cavity forms, together with measuring means, converting means for the reflected radiation, a change occurring in the cavity being representative of a relative movement of the object. The measuring means could for example comprise means for the measurement of a change in the impedance of the laser cavity. Also a radiation detector is suitable for this purpose.

A disadvantage of the known device is that it is not sufficiently compact for many applications for which ever smaller dimensions are being demanded. Above all, large scale production of the device is not easy and not inexpensive.

It is therefore an object of the invention to produce a device of the type stated in the introduction which is particularly compact and easy and inexpensive to produce.

For this reason a device of the type stated in the introduction is characterized, according to the invention, in that the device includes a further optical component which includes a block-shaped body which is mounted next to the laser directly on to the mounting board and which, when viewed in projection, has no overlap with the laser, and of which at least the uppermost part is optically transparent and of which the upper side forms the plane close to the object. On the one hand, this means that the device can be relatively compact. The measuring radiation beam can be led to the block-shaped body at a small angle to the mounting board. With this small angle the radiation beam can reflect within the transparent part of the block-shaped body backwards and forwards a number of times before the upper plane is reached. As a result, according to the invention, both the lateral dimensions and the height of the device are limited, while yet a relatively large optical range is created for the radiation beam as required for proper operation of the device. On the other hand, the most important components of the device, such as the laser, the optical component, which for example comprises a mirror, and the block-shaped body, can now be attached to the mounting board all by means of surface mounting. This can be done with relatively high precision of alignment, and fast and cheaply, with the help of so-called pick and place machines. Because of the fact that the block-shaped body does not in any way have any overlap particularly with the laser, it can easily be enclosed by a transparent plastic material. A liquid transparent plastic material which cures after application is particularly suited for this purpose.

Preferably one side of a first part of the transparent uppermost part of the block-shaped body directed towards the measuring radiation beam is made tilted outwards. This enables any interruption of the measuring radiation beam on entering the block-shaped body to be corrected. The angle of said side to the normal would amount for example to 30 degrees. The uppermost part of the block-shaped body further includes a second part lying on the first part, with its side planes approximately vertical to the mounting board. Within this part the radiation beam can reflect a number of times. The block-shaped body is preferably wholly made of a transparent plastic such as PMMA (=PolyMethyl-MetaAcrylate) or Polycarbonate.

In a useful variant the measuring means comprise a radiation detector mounted on the mounting board and the optical component comprises a converging mirror which is located on a side plane of a further block-shaped body which is mounted on the mounting board, and this side plane is fitted with a further mirror which casts part of the radiation emitted by the laser on the radiation detector.

In a preferred embodiment of an input device according to the invention, the laser, the measuring means and the optical means are enveloped in a cured optically transparent gel which also includes the whole radiation path from the laser to the block-shaped body. This results in a compact and inexpensive envelope of at least the most vulnerable and sensitive components of the device or module. This also results in limitation of the number of media transitions where reflection can occur. In this case the best results are obtained with a transparent silicon plastic material.

Preferably the mounting board is in an electrically and thermally insulated material and one side of the mounting board is fitted with a conductor unit to which the laser and the measuring means are connected. This too contributes to the compactness of the device. The device is above all inexpensive, because a large number of devices can be produced at the same time. A so-called PCB (=Printed Circuit Board) forms a particularly suitable mounting board.

In a particularly advantageous modification of this variant the mounting board has an opening near the laser of which opening at least the walls are covered with a thermally conductive material which forms a heatsink for the laser or which forms a thermal connection between the laser and a heatsink for the laser. If the opening is completely filled with a material such as copper the laser can be mounted on it. If so desired the laser can advantageously also be mounted next to the opening, and in this way the conductive material in the opening connects the laser with a heatsink fitted under the mounting board. These variants make it possible to reduce the height dimension of the device, or at any rate that part lying above the mounting board of the module.

A method of operation for the measurement of the movement of an object in relation to an input device is characterized according to the invention by the fact that use is made of an optoelectronic input device in accordance with one of the above-mentioned conclusions. Because of the compactness the device is particularly suitable for application as input unit for operating a so-called scroll menu in the operation of a mobile telephone. Also, in a laptop computer, the device can advantageously be applied as a so-called pressure cushion for finger operation of various menus.

A method of operation for the production of an optoelectronic input device, in which the input is formed by detected movements of an object and the device is fitted with an optical module containing at least one laser with a cavity for the generation of a measuring radiation beam, optical means for leading the radiation beam to a plane close to the object and converting means for converting the radiation of the measuring radiation beam reflected by the object into an electrical signal, in which the converting means are formed by the combination of the cavity of the laser and measuring means for the measurement of a change in the cavity during operation which is caused by interference of the reflected beam of the measuring radiation beam which penetrates into the cavity and the constant wave in the cavity and which is representative of a relative movement of the object in relation to the module, the optical module being formed by a mounting board on which a laser is mounted with its cavity parallel to this board and the optical means are formed by an optical component mounted on the mounting board and aligned to the laser for the measuring radiation beam emitted by the laser which is led from there to the plane close to the object, is characterized according to the invention in that the device is equipped with a further optical component that comprises a block-shaped body which is mounted next to the laser directly on to the mounting board and viewed in projection does not overlap in any way with the laser and of which at least the uppermost part is optically transparent and of which the upper side forms the plane close to the object. In this way an input device according to the invention is obtained.

Preferably the measuring means are formed by a radiation detector which is mounted on the mounting board and the optical component is formed as a converging mirror and attached to a side plane of a further block-shaped body which is mounted on the mounting board, and which side plane is fitted with a further mirror which casts part of the radiation emitted by the laser on the radiation detector.

In a preferred embodiment the laser, the measuring means and the optical means are covered with a liquid optically transparent gel which envelopes the whole radiation path from the laser to the block-shaped body and which cures after application.

Preferably an electrically and thermally insulating material is chosen for the material of the mounting board of which one side is fitted with a conductor unit to which the laser and the measuring means are connected. In this way the most important parts are attached to the mounting board by means of surface mounting. Most advantageously, the parts of the device such as the laser, the further optical component, the optical means and the measuring means can be placed on the mounting board with the help of standard pick and place machines.

In a particularly advantageous variant, before the alignment-sensitive parts of the device such as laser, further optical component, the optical means or the measuring means are placed on the mounting board, adhesive regions are formed on the mounting board of which regions the lateral dimensions are selected to be almost identical to the lateral dimensions of the relevant part on the side which is mounted on the mounting board. As a result, an accurate alignment of the relevant parts can be further improved in that minor corrections to the position of the parts can still be made in self-registering fashion with the help of the adhesive regions. Regions provided with solder are particularly suitable for this purpose. During the melting of the solder the parts of which the underside is provided with a metal layer are aligned in self-registering manner in relation to the solder regions. Also the parts that do not need any electrical connection such as the block-shaped body and the further block-shaped body can be advantageously attached and aligned in this way. For this purpose the underside of these parts will be specially provided with a metal layer. A laser and detector crystal will have a conductive layer of this kind as standard.

Figure 2:
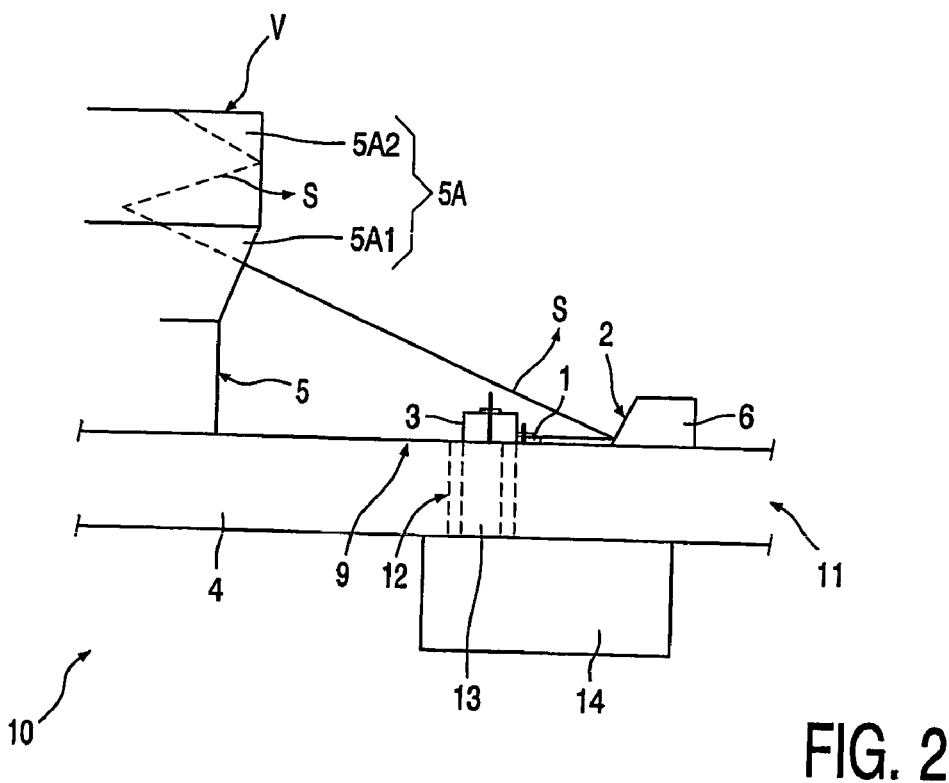
Figure 3:
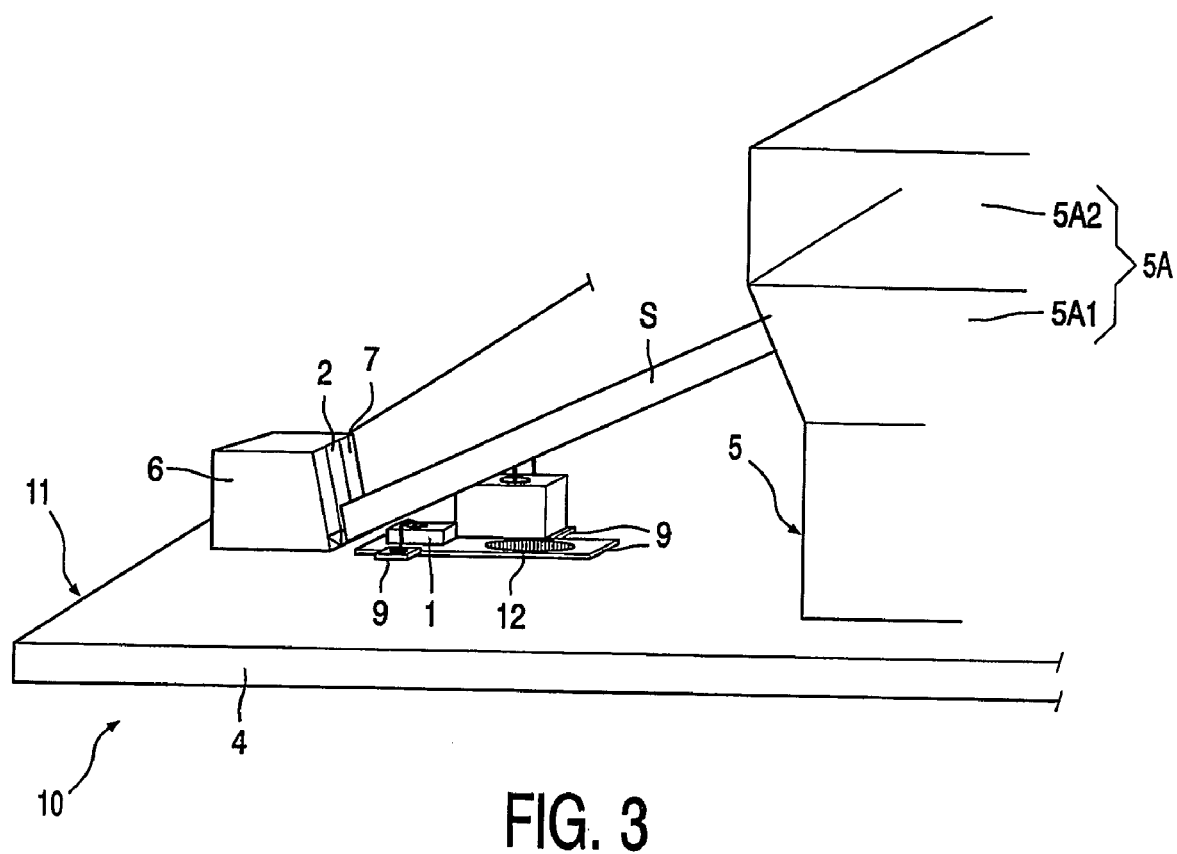
Figure 4:
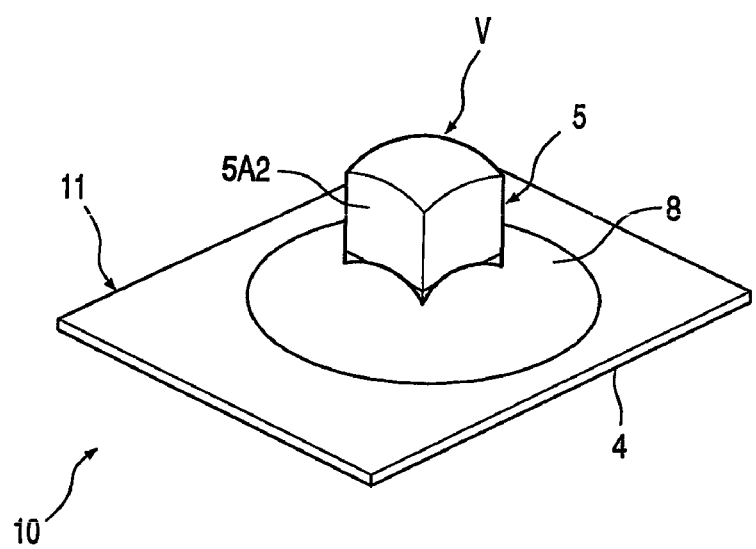

These and other objects and advantageous aspects of the invention will be described in more detail using the following Figures, wherein FIG. 1 shows in a diagrammatic and perspective view an embodiment of an optoelectronic input device according to the invention, FIG. 2 shows in a diagrammatic view part of this device in a side view in a direction which is denoted II in FIG. 1, FIG. 3 shows in a diagrammatic view part of the device in perspective view from a direction which is denoted m in FIG. 3; and FIG. 4 shows in a diagrammatic and perspective view an important variant of the device shown in FIG. 1.

The Figures are not drawn to scale and some dimensions, such as dimensions of thickness, are exaggerated for clarity. Corresponding regions or parts in the various Figures are, as far as possible, given the same reference number.

The input device 10 shown in FIG. 1 comprises a module 11 with a mounting board 4, here a PCB 4. On this board there is a conductor unit 9', here in the form of copper regions 9. On them a laser 1 and a photodiode 3 are mounted. For the top connection of the laser 1 and the photodiode 3 use is made of a wire connection 20. On one side of the laser 1 and the photodiode 3 are located optical means 2 in the form of a converging mirror 2 which receives a measuring radiation beam S emitted by the laser 1—here an angle of approximately 30 degrees to the mounting board—and guides this to a further optical component (see FIG. 2 or 3) which comprises a block-shaped body which is located on one side of the laser 1 on the mounting board 4. In this embodiment the module 11 contains more lasers 1,1' of which only two are to be seen in the drawing. Also the parts 2,3 associated with each laser 1, 1' are present in corresponding numbers.

The block-shaped body 5 is here completely made of a transparent plastic material, here PMMA. The radiation beam S enters (see FIG. 2) the body 5 via a first part 5A1 of the uppermost part 5A and reaches, after a number of reflections inside a part 5A2 lying on the first part 5A1, the top plane V of the body 5 over which (see FIG. 1) there is a moving object M, for example a piece of paper or, as shown in the Figure, the finger M of a person who is operating the device 10. Radiation reflected by the moving finger M travels the reverse way and reaches the cavity of the laser 1 and there causes a change as a result of the occurrence of interference caused by the movement of the finger. In the embodiment the occurrence of the change in the cavity of the laser 1 is measured with the help of a radiation detector 3, here a photodiode 3, on which part of the radiation emitted by the laser 1 is incident. This takes place with the help of a further mirror 7 (see FIG. 3) which is located on a side plane of a further block-shaped body 6, here also made of plastic material. The mirror 2 which reflects the radiation beam S to the body 5 is mounted on the same side plane. The cavity, the further mirror 7 and the radiation detector 3 form converting means C which convert the radiation reflected and modulated by the object M into an electrical signal.

Further particulars of the detection of a finger movement are shown in patent application US 2002/0104957 referred to above.

As shown in FIG. 2, there is an opening 12 in the mounting board 4 close to the laser 1, of which opening at least the walls are covered with a thermally conductive material 13, copper in this case, which connects the laser 1 with a heatsink 14 which is located on the side of the mounting board 4 opposite the laser 1.

Each side plane of the first part 5A1 of the uppermost part 5A of the block-shaped body 5 and located opposite a mirror 2—30 degrees to the normal here—is constructed tilted outwards. In this way any occurrence of reflection from the radiation beam S on entering the body 5 can be counteracted.

The laser 1—and here also the remaining parts such as the photodiode 3 and the further block-shaped body 6—are located—viewed in projection—outside the block-shaped body 5, which has a noticeable advantage indicated in FIG. 4.

FIG. 4 shows in a diagrammatic and perspective view an important variant of the device of FIG. 1. Here a transparent plastic envelope 8 can be seen, which can be easily applied thanks to the absence of overlap between the body 5 and the further parts 3,6. The envelope 8 comprises the whole radiation path of the beam S between the laser and the body 5 and protects the parts covered thereby and contributes to a stable operation of the device 10, also because disturbing reflections are avoided or at least limited as a result thereof. If desired a thin further envelope—not shown in the drawing—can be applied over the envelope 8 and which is not transparent to radiation. The envelope 8 is here a silicon-based plastic material, a material that is particularly suitable for this purpose. Further, and preferably, as shown in FIG. 4, the upper plane V of the body 5 is embodied with an arched shape. As a result, the user of a piece of equipment in which the device is incorporated, such as a mobile telephone, can easily find the surface and properly clean this surface.

The device according to the invention, for example the embodiment 10 shown in the Figures, can be produced as follows with the help of a method of operation according to the invention. The starting point (see for example FIG. 1) is a PCB 4 which has an opening 12 of which the walls are covered with a copper layer 13. On the upper side of the plate 4 a conductor unit 9 is fitted for connection of electrically active parts such as the laser 1 and the photodiode 3. Particularly for the alignment-sensitive parts such as the laser 1 and the photodiode 3, but also for the block-shaped body 5,6 solder regions—not visible in the drawing—are applied on the upper side of the plate 4 on previously determined and precise positions. The dimensions of these regions are chosen to be practically identical to the dimensions of the parts to be placed, such as laser 1, photodiode 3 and the bodies 5,6. All these parts 1,3,5 6 have on their underside a metal layer—not shown in the drawing either.

Then with the help of pick and place machines the above-mentioned parts 1,3,5,6 are placed relatively accurately on the above-mentioned solder regions. The fixing to the plate 4 then takes place during a soldering process whereby minor deviations of the placed parts are automatically corrected.

This provides a sufficiently accurate alignment of the parts 1,3,5 6 of the module 11 in relation to one another in an easy, rapid and inexpensive manner. After this surface mounting of said parts, the required additional electrical connections of the electrically active parts can be achieved with wire connections 20. A thermo-compression technique is used for this.

Then (see FIG. 4) an envelope in the form of drop 8 of a silicon plastic material is applied which covers the laser 1, the photodiode 3 and the mirror 2. The radiation path of the beam S between the laser and the body 5 is then found within this drop. The electrical connections of the electrically active parts 1,3 (not shown in the drawing) extend to outside the envelope 8 or are located if desired on the underside of the plate 4. After curing of the envelope 8—for example through warming—the device 10 is ready for use. Thanks to the construction of the module 11 a large number of devices 10 can easily be produced at the same time. They can be separated from one another by a separation technique such as sawing. The dimensions of an individual device 10 are approximately 30×30 mm, whereas the height is not more than 10 mm. The body 5 is 10 mm high and measures for example 5 mm×5 mm.

The invention is not limited to the example of embodiment described since to a specialist many variations and modifications are possible within the framework of the invention. Thus devices can be produced with a different geometry and/or different dimensions. Depending on the application the device according to the invention can also include one or more than two laser(s) and their associated parts. In place of a PCB substrate, another substrate, such as glass or ceramic substrate, may be used.

It may further be pointed out that the device may include further active and passive semiconductor elements or electronic components such as diodes and/or transistors and resistances and/or capacitances, whether or not in the form of an integrated circuit. The production is then obviously very much adapted to the purpose. Also the addition of a processor or other electronic equipment for the reading and/or control of the laser is included in this.

A change in the cavity of a laser, which change represents a finger movement, is established also in an exclusively electrical manner, for example by the measuring of the impedance of the cavity, as described in United States patent application US 2002/0104957. Also the addition of a processor or other electronic components for reading and/or control of the laser is included in this.

The invention claimed is:

1. Optoelectronic input device (10) in which the input is formed by detected movements of an object (M), the device comprising an optical module (11) comprising at least one laser (1,1') with a cavity for the generation of a measuring radiation beam (S), optical means (2) for the guidance of the radiation beam (S) to a plane (V) close to the object (M) and converting means (C) for the conversion of radiation of the measuring radiation beam (S) reflected and modulated by the object (M) into an electrical signal, the converting means C being formed by the combination of the cavity of the laser (1) and measuring means (3) for the measuring of a change in the cavity during operation which is caused by the reflected radiation entering the cavity which radiation is representative of a movement of the object (M) relative to the module (11), the optical module (11) comprising the laser (1) which is mounted on a mounting board (4) with its cavity parallel to it, and the optical means (2) comprising an optical component (2) mounted on the mounting board (4) and aligned to the laser (1) from where the measuring beam (S) emitted by the laser (1) goes to the plane (V) close to the object (M), characterized in that the device (10) includes a further optical component which includes a block-shaped body (5) which is mounted next to the laser (1) directly on to the mounting board (4) and which, when viewed in projection from above the mounting board, has no overlap with the laser (1), and of which at least the uppermost part (5A) is optically transparent and of which the upper side forms the plane (V) close to the object (M).

2. Optoelectronic input device (10) as claimed in claim 1, characterized in that the transparent uppermost part (5A) of the block-shaped body (5) contains a first part (5A1) of which a side is tilted outwards towards the measuring radiation beam (S) and a second part (5A2) lying on the first part (5A1) of which the outer sides are approximately perpendicular to the mounting board (4).

3. Optoelectronic input device (10) as claimed in claim 1, characterized in that the whole block-shaped body (5) is made of an optically transparent plastic material.

4. Optoelectronic input device (10) as claimed in claim 1, characterized in that the measuring means (3) comprise a mounting-board-mounted radiation detector (3) with which there is no overlap with the block-shaped body (5) and the optical component (2) comprises a mirror which is converging and is located on a side plane of a further block-shaped body (6) which is mounted on the mounting board (4) and with which there is no overlap with the block-shaped body (5), which side plane includes a further mirror (7) which casts part of the radiation emitted by the laser (1) on the radiation detector (3).

5. Optoelectronic input device as claimed in claim 1, characterized in that the laser (1), the measuring means (3) and the optical means (2) are covered with a cured optically transparent gel (8) which also comprises the whole radiation path from laser to the block-shaped body (5).

6. Optoelectronic input device (10) as claimed in claim 5 characterized in that the cured optically transparent gel (8) comprises a silicon plastic material.

7. Optoelectronic input device (10) as claimed in claim 1, characterized in that the mounting board (4) is made of an electrically and thermally insulating material and of which one side is provided with a conductor unit (9) to which the laser (1) and the measuring means (3) are connected.

8. Optoelectronic input device (10) as claimed in claim 7 characterized in that the mounting board (4) next to the laser (1) has an opening (12) of which at least the walls are covered with a thermally conductive material (13) which forms a heatsink for the laser (1) or is in connection with a heatsink (14) for the laser (1).

9. Optoelectronic input device as claimed in claim 7 characterized in that the mounting board (4) comprises a printed circuit board.

10. Method of operation for the measurement of the movement of an object (M) relative to an input device (10) characterized in that use is made of an optoelectronic input device (10) in accordance with claim 1.

11. Method of operation for the production of an optoelectronic input device (10) in which the input is formed by detected movements of an object (M), the device comprising an optical module (11) comprising at least one laser (1,1') with a cavity for the generation of a measuring radiation beam (S), optical means (2) for the guidance of the radiation beam (S) to a plane (V) close to the object (M) and converting means (C) for the conversion of radiation of the measuring radiation beam (S) reflected and modulated by the object (M) into an electrical signal, the converting means C being formed by the combination of the cavity of the laser (1) and measuring means (3) for the measuring of a change in the cavity during operation which is caused by the reflected radiation entering the cavity which radiation is representative of a movement of the object (M) relative to the module (11), the optical module (11) comprising the laser (1) which is mounted on a mounting board (4) with its cavity parallel to it, and the optical means (2) comprising an optical component (2) mounted on the mounting board (4) and aligned to the laser (1) from where the measuring beam (S) emitted by the laser (1) goes to the plane (V) close to the object (M), characterized in that the device (10) includes a further optical component which includes a block-shaped body (5) which is mounted next to the laser (1) directly on to the mounting board (4) and which, when viewed in projection from above the mounting board, has no overlap with the laser (1), and of which at least the uppermost part (5A) is optically transparent and of which the upper side forms the plane (V) close to the object (M).

12. Method of operation as claimed in claim 11, characterized in that the measuring means (3) are formed by a radiation detector (3) which is mounted on the mounting board (4) and the optical component (2) is formed as a converging mirror and mounted on a side plane of a further block-shaped body (6) which is mounted on the mounting board (4), this side plane being equipped with a further mirror (7) for reflecting part of the radiation emitted by the laser (1) to the radiation detector (3).

13. Method of operation as claimed in claim 12, characterized in that the laser (1), the measuring means (3) and the optical means (2) are covered with a liquid optically transparent gel (8) which comprises the whole radiation path from the laser to the block-shaped body (5) and which is cured after application.

14. Method of operation as claimed in claim 12, characterized in that for the material of the mounting board (4) an electrically and thermally insulating material is chosen of which one side is provided with a conductor unit (9) to which the laser (1) and the measuring means (3) are connected.

15. Method of operation as claimed in claim 12, characterized in that the parts of the device (10) such as the laser (1), the further optical component (5), the optical means (2) and the measuring means (3) are placed on the mounting board (4) by means of standard pick and place machines.

16. Method of operation as claimed in claim 12, characterized in that before the alignment-sensitive parts of the device (10) such as the laser (1), the further optical component (5), the optical means (2) or the measuring means (3) are placed on the mounting board (4), adhesive regions are formed on the mounting board (4) the lateral dimensions of which are selected to be practically identical to the lateral dimensions of the corresponding part on the side which is fastened to the mounting board (4).

* * * * *